United States Patent [19]

Fujimori

[11] Patent Number: 5,412,517
[45] Date of Patent: May 2, 1995

[54] MAGNETIC TAPE RECORDING/PLAYBACK DEVICE WITH PLAYBACK MONITORING

[75] Inventor: Motoyoshi Fujimori, Chiba, Japan

[73] Assignee: Sony Corporation, Tokyo, Japan

[21] Appl. No.: 145,562

[22] Filed: Nov. 4, 1993

[30] Foreign Application Priority Data

Nov. 11, 1992 [JP] Japan .................. 4-324637

[51] Int. Cl.⁶ .............................................. G11B 15/14
[52] U.S. Cl. ...................................................... 360/64
[58] Field of Search ...................... 360/64, 62, 61, 63, 360/32, 48, 51, 107

[56] References Cited

U.S. PATENT DOCUMENTS

| | | | |
|---|---|---|---|
| 4,796,105 | 1/1989 | Mawatari | 360/64 |
| 5,018,036 | 5/1991 | Yamashita | 360/64 X |
| 5,023,731 | 6/1991 | Morisaki | 360/64 |
| 5,187,617 | 2/1993 | Kaminaga | 360/64 |

*Primary Examiner*—Donald Hajec
*Assistant Examiner*—Thien Minh Le
*Attorney, Agent, or Firm*—Jay H. Maioli

[57] ABSTRACT

A recording/playback device for a magnetic tape includes a rotary drum about which the magnetic tape is wrapped obliquely, two recording heads arranged within the rotary drum at an angular distance of substantially 180° from each other for recording data, and two playback heads arranged within the rotary drum at an angular distance of substantially 180° from each other for reproducing recorded data. The recording heads and the playback heads are substantially orthogonally arranged within the rotary drum. There is a height difference between the playback heads and the recording heads related to a track pitch of a recording format for a particular magnetic tape, with the playback heads being mounted at a lower position relative to the recording heads. The recording/playback device also includes a signal processing circuit for recognizing the readout timing of playback data sequentially entered from the playback heads for monitoring the data recorded by the recording heads.

5 Claims, 7 Drawing Sheets

MAGNETIC TAPE RECORDING/PLAYBACK DEVICE WITH PLAYBACK MONITORING

BACKGROUND OF THE INVENTION

1. Field of the Invention

This invention relates to a magnetic tape recording playback device for recording digital data on a magnetic tape and reproducing the data recorded on the tape. More particularly, it relates to a magnetic tape recording/playback device in which, when recording data on the magnetic tape, the recorded data is monitored so that data recording may be made while the recording state is checked simultaneously.

2. Description of the Related Art

A magnetic recording/playback device, known as R-DAT, in which rotary heads, each including a rotary drum fitted with a magnetic head, rotate so that the magnetic head maintains sliding contact with the magnetic tape with a tilt relative to the longitudinal direction of the magnetic tape for recording digital signals has been developed. The magnetic head records data onto the magnetic tape, and in which data recorded in this manner on the tape can be reproduced, and put to practical application.

The rotary heads loaded on the R-DAT are comprised of two magnetic heads which may be employed both for recording and for playback and which are arranged with a spacing of approximately 180° relative to each other. The relative position between the magnetic tape and the magnetic heads is set so that the locus of movement of each magnetic head is inclined with respect to the longitudinal direction of the magnetic tape.

Such R-DAT is presently employed not only for recording digital audio data on the magnetic tape or reproducing the recorded audio data from the magnetic tape, but also for a back-up external storage device of a computer control program or data, referred to hereinafter as computer data.

Especially, in view of the demand for assuring positive data storage, assuring the back-up of computer data is needed to provide a method of checking whether the computer data has been correctly recorded on the magnetic tape.

In a conventional recording/playback device for a magnetic tape, as disclosed in JP UM KOKOKU Publication No. 4-18081 (1992), first and second recording heads for recording digital data on a magnetic tape are arranged on a rotary drum at an angular distance of 180° relative to each other, and a first playback head for reading the data recorded on the magnetic tape by the first recording head is arranged at a position delayed 270° from the first recording head, while a second playback head for reading the data recorded on the magnetic tape by the second recording head is arranged at a position delayed 270° from the second recording head. A playback head is arranged at a height position lower by $1.5 Tp + (Tw - Tp)/2$ lower than the recording head, where Tp is the track pitch of the recording format recorded by the recording heads and Tw is the head width. Data recording is made as the data recorded by the recording heads are monitored by the playback heads for confining the recording state.

Meanwhile, an external storage device for assuring computer data back-up currently in use is a flexible disc rotatably accommodated in a disc cartridge. The recording format for such flexible disc is not standardized, and one of a variety of recording formats may be selected depending on the data volume desired to be stored.

A similar concept is employed for magnetic tapes adapted for R-DAT, such that there are two recording formats for storage of computer data, namely a DDS format with an ordinary track pitch and a DDS-2 format with a narrow track pitch. That is, there are two different types of magnetic tapes as far as the recording format is concerned.

Since only one type of recording format may be applied for conventional recording/playback device using magnetic tapes, it becomes necessary to provide different rotary heads for the different recording formats. Although it is possible to increase the number of magnetic heads by correspondingly increasing the number of channels of the rotary transformers to cope with different recording formats by a sole rotary head, it becomes necessary in such case to find an optimum value of the head width of the playback heads from the electro-magnetic conversion characteristics and automatic track following (ATF) characteristics, by reason of the necessity of having the recording track correctly followed by the playback heads, with the consequence that the designing of the rotary heads become excessively complicated.

Besides, since the rotary drum diameter is as small as 30 mm and hence limitations are imposed on the number of the magnetic heads and the rotary transformers that may be mounted on the rotary drum, and manufacture difficulties, such as drastic changes in the rotary drum construction, are incurred if the numbers of the playback heads or the rotary transformers are to be increased, while manufacture costs are also raised.

OBJECTS AND SUMMARY OF THE INVENTION

It is an object of the present invention to provide a magnetic tape recording/playback device which is free from the above-described inconveniences of the prior-art device and in which monitoring of recorded data may be made in a manner adapted to different recording formats by only two playback heads arranged on the rotary drum at an angular distance of 180° from each other.

According to the present invention, there is provided a recording/playback device for a magnetic tape comprising a rotary drum about which a magnetic tape is wrapped obliquely for a certain angular extent, first and second recording heads arranged within said rotary drum at an angular distance of substantially 180° from each other for recording data on the magnetic tape, and first and second playback heads arranged within the rotary drum at an angular distance of substantially 180° from each other for reproducing the data recorded on the magnetic tape. The first and second recording heads and the first and second playback heads are arranged within the rotary drum so that a straight line interconnecting the first and second recording heads and another straight line interconnecting the first and second playback heads are normal to each other. There is provided a level difference related to a track pitch of a recording format for a particular magnetic tape between the recording heads and the playback heads. The playback heads are mounted at a lower position relative to said recording heads corresponding to said level difference. The recording/playback device also includes a signal processing circuit for recognizing playback data sequentially entered from the playback heads which is read with a readout timing formed by the sequence of sliding contact of the magnetic tape of the playback heads for monitoring mth data recorded by the recording heads, using a time point of recording of mth address data on the recording tape by said recording heads.

Other objects and advantages of the present invention will become more apparent from the following detailed description of the preferred embodiments and the appended claims.

BRIEF DESCRIPTION OF THE DRAWINGS

FIGS. 5A and 5B illustrate the sequence of sliding contact between the recording heads and the playback heads and the readout timing in the magnetic tape recording/playback device according to the present invention, where

DESCRIPTION OF THE PREFERRED EMBODIMENT

Referring to FIGS. 1 to 7, a preferred embodiment of the magnetic tape recording/playback apparatus according to the present invention is explained.

Figure 1:
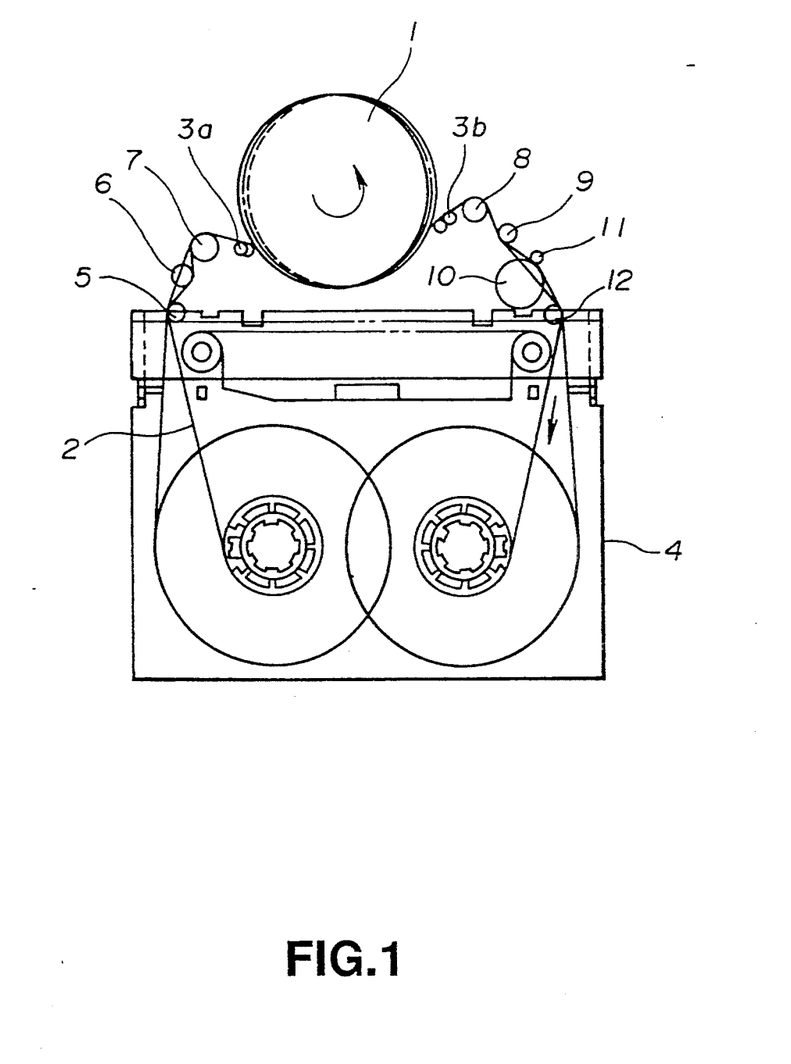
FIG. 1 is a plan view showing essential parts of the magnetic tape recording/playback device according to the present invention.

With the magnetic tape recording/playback apparatus, according to the present invention, a cylindrical-shaped rotary head 1, having a diameter of approximately 30 mm, is mounted at a tilt angle of approximately 7.7° to 8.0° relative to a chassis base plate, and data is recorded in linear tracks on the magnetic tape 2 in accordance with the helical scan system, as shown in FIG. 1.

The loading mechanism of the present recording/playback apparatus is of a so-called M-loading system, as shown in FIG. 1, and tilt guides 3a, 3b for causing the magnetic tape 2 to run obliquely relative to the rotary head 1 are provided in the vicinity of both extreme ends of a sliding contact area of the magnetic tape 2 with the rotary head 1. In the present embodiment, the wrap angle of the magnetic tape 2 around the rotary head 1 is set to 90°.

The magnetic tape 2 pulled out of a tape cassette 4, loaded in position, and led via a second roll guide 5 and a tension control pin 6 to a first roll guide 7 having the maximum wrap angle so as to be then changed in its direction by the tilt guide 3a and wrapped around a reel, not shown, of the rotary head 1. The magnetic tape 2 which is run on the reel of the rotary head 1 is then guided by the tilt guide 3b and a first roll guide 8 from which it travels along a tape path parallel to the reference plane. The magnetic tape 2 is then led to a second roll guide 9 and thence to a pinch roll 10 and a capstan 11, which runs the magnetic tape 2, as the magnetic tape is supported from below. The magnetic tape 2 which has passed through the capstan 11 is taken up on the tape cassette 4 via a third roll guide 12.

Figure 3:
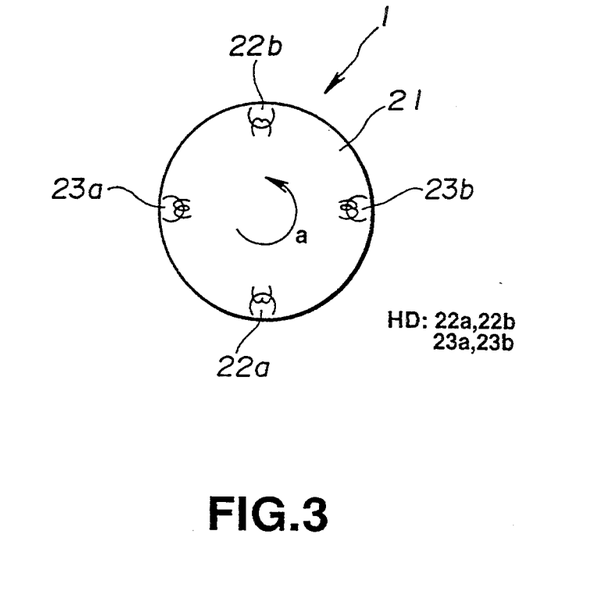
FIG. 3 is a plan view showing the relative position of the recording heads and the playback heads with respect to a rotary drum of magnetic tape recording/playback device according to the present invention.
Figure 4:
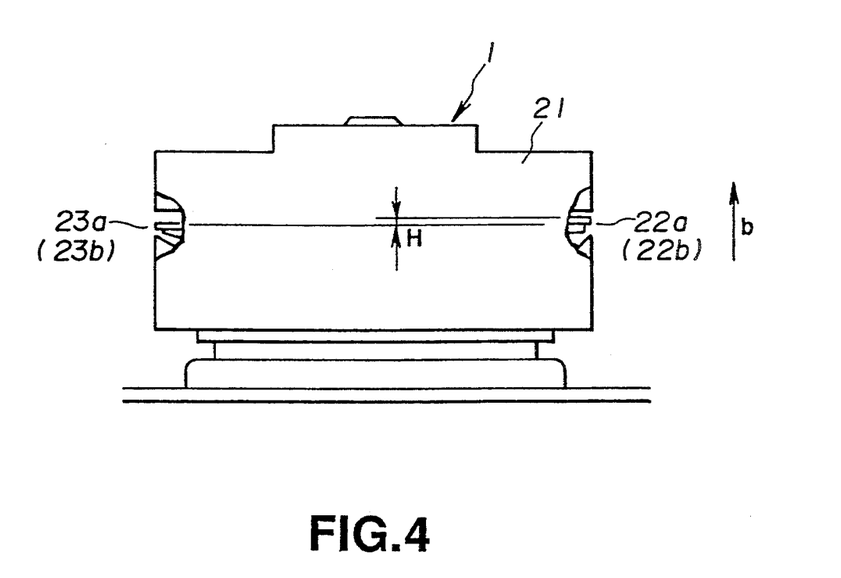
FIG. 4 is a side view showing the relative position of the recording heads and the playback heads with respect to a rotary drum of magnetic tape recording/playback device according to the present invention, with a portion thereof being broken away.

Referring to FIGS. 3 and 4, with the present rotary head 1, a first recording head 22a and a second recording head 22b for recording digital data on the magnetic tape 2 are arranged on one lateral side of the cylindrical-shaped rotary drum 21 at an interval of substantially 180° relative to each other, while a first playback head 22a and a second playback head 22b for reproducing digital data from the magnetic tape 2 are arranged on the same lateral side of the cylindrical-shaped rotary drum 21 at an interval of substantially 180° relative to each other, as shown in FIG. 3. The recording heads 22a, 22b and the playback heads 23a, 23b are arranged relative to one another so that a line interconnecting the recording heads 22a and 22b is substantially at right angles to a line interconnecting the playback heads 23a and 23b.

Above all, with the present embodiment, when the rotary drum 21 is rotated counterclockwise, that is in a direction shown by arrow a in FIG. 3, and the first magnetic head 22a is first contacted with the magnetic tape 2, the magnetic heads HD (22a, 22b, 23a, 23b) are slidingly contacted with the magnetic tape 2 in the sequence of the first recording head 22a, first playback head 23a, second recording head 22b and the second playback head 23b, in that sequence.

Figure 2:
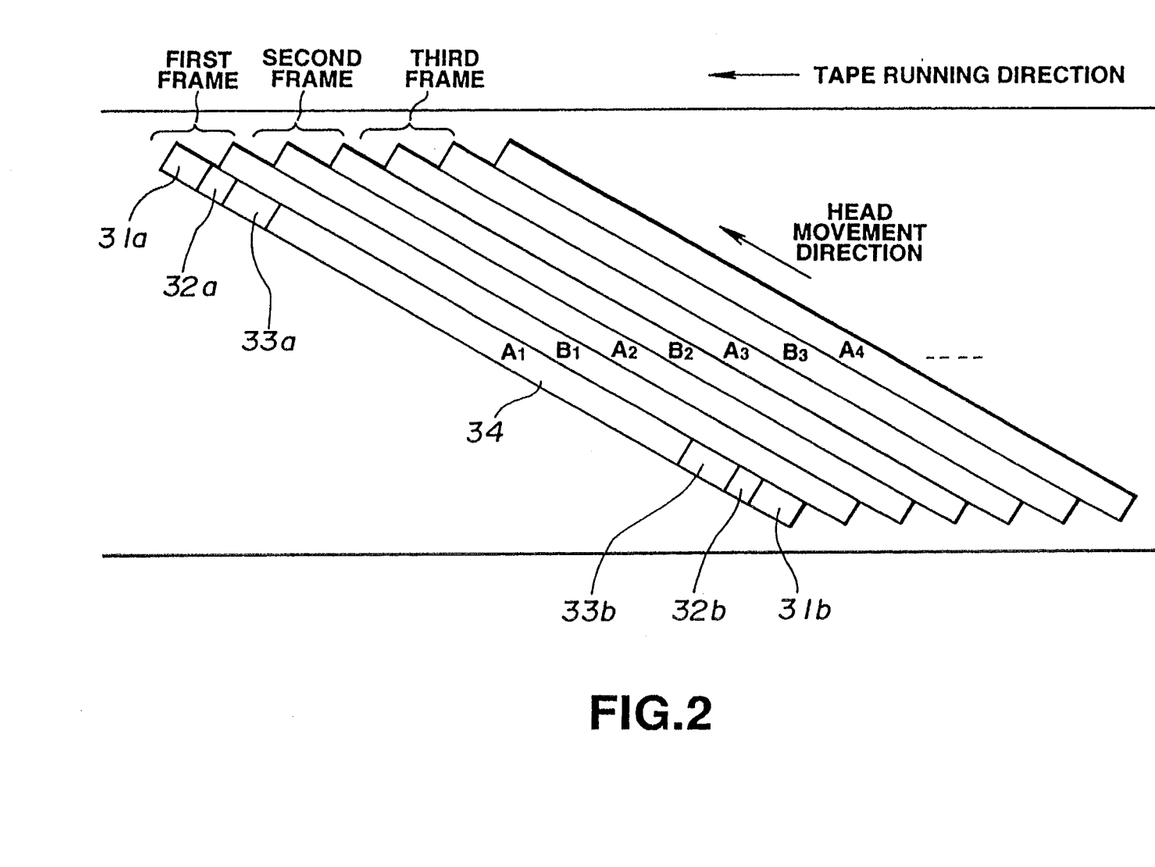
FIG. 2 is a schematic showing a recording track pattern for the magnetic tape recording/playback device according to the present invention.

Since the rotary head 1 is slightly inclined relative to the reference plane, and the magnetic tape 2 is run obliquely relative to the rotary head 1 by the tilted guides 3a, 3b, the recording tracks on the magnetic tape 2 are elongated straight tracks sightly inclined relative to the running direction of the magnetic tape 2, as shown in FIG. 2.

As for signal arrays on the recording tracks A1, B1, A2, B2, . . . , preliminary marginal areas 31a, 31b through which the magnetic head HD is moved until a stable contacting state is reached between the magnetic tape 2 and the magnetic head HD are provided at both ends of the recording tracks, represented herein by the recording track A1. A main area 34 is provided at a mid portion of the recording track A1 for storing main data, and sub-areas 32a, 32b and ATF areas 33a, 33b are provided between the marginal areas 31a, 31b and the main area 34 as shown. Sub-code signals, such as time or address signals, are recorded in the sub-areas 32a, 32b, while ATF signals as tracking correction signals are recorded in the ATF areas 33a and 33b.

In the present embodiment, for accurately reading data recorded by the recording heads 22a, 22b by the playback heads 23a, 23b, that is for monitoring the data while recording by the playback heads 23a, 23b, a step-shaped level difference H along the heightwise direction as shown by arrow b in FIG. 4 is provided between the recording heads 22a, 22b on one hand and the playback heads 23a, 23b on the other hand as shown in FIG. 4. That is, the playback heads 23a, 23b are lower in height by the step difference H than the recording heads 22a, 22b.

Figure 5A:
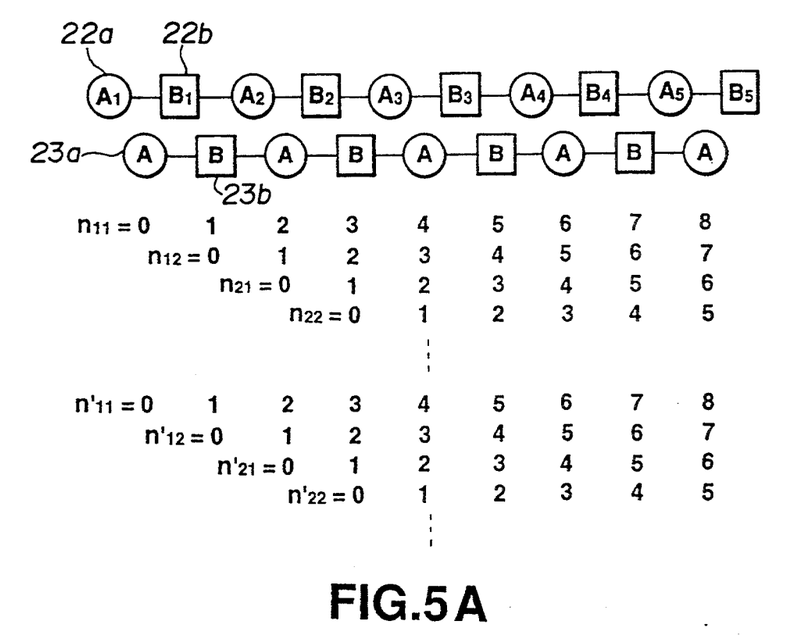
FIG. 5A illustrates the readout timing when data recorded by the first and second recording heads are monitored by the first and second playback heads, respectively.
Figure 5B:
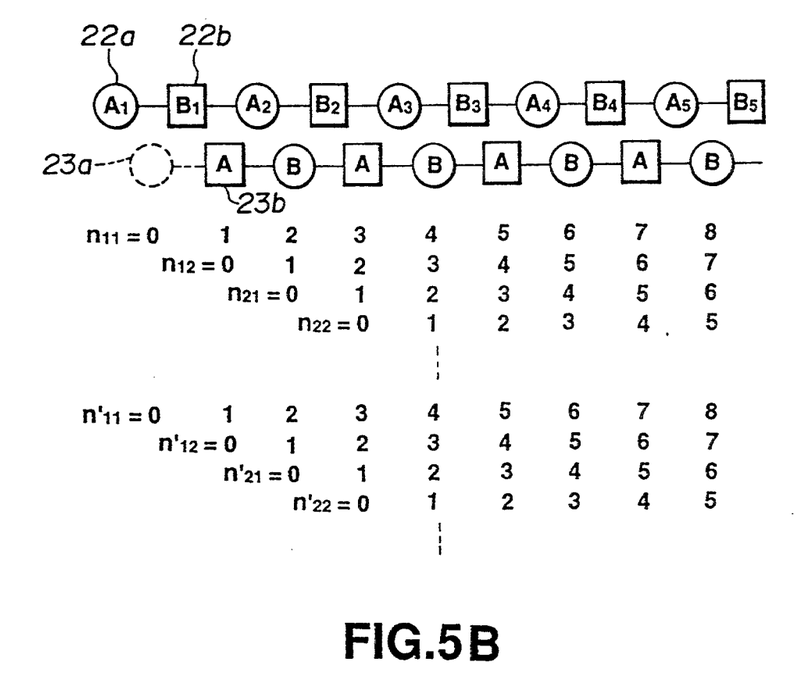
FIG. 5B illustrates the readout timing when data recorded by the first and second recording heads are monitored by the second and first playback heads, respectively.

The manner in which the step difference H is found is hereinafter explained. FIGS. 5A and 5B show the sequence of sliding contact of the magnetic heads 22a, 22b, 23a, 23b of the rotary head 1 with the magnetic tape 2 to the first recording head 22a and the first playback head 23a maintain sliding contact with the magnetic tape during the first one-half revolution, and the second recording head 22b and the second playback head 23b maintain sliding contact with the magnetic tape during the second one-half revolution. With the revolution of the rotary head 1, the magnetic heads 22a, 22b, 23a, 23b maintain sliding contacted with the magnetic tape 2 in the above-defined sequence of. Consequently, this sequence. of sliding contact represents the readout timing by the first and second playback heads 23a, 23b.

Referring to FIGS. 5A and 5B, stands for the first recording head 22a and the first playback head 23a, while □ stands for the second recording head 22b and the second playback head 23b. In FIGS. 5A and 5B, A1, B1, A2, B2, . . . entered in the marks and □ for the recording heads 22a and 22b correspond to the recording tracks A1, B1, A2, B2, . . . shown in FIG. 2, respectively. A first frame is constituted by the recording tracks A1 and B1, and a second frame is constituted by the recording tracks A2 and B2, and so forth, so that successive frames are constituted by paired recording tracks An and Bn.

Also, in FIGS. 5A and 5B,. $n_{11}$, $n_{12}$, $n_{21}$, $n_{22}$, . . . and $n_{11}'$, $n_{12}'$, $n_{21}'$, $n_{22}'$, . . . . indicate the sequence in which the first and second playback heads 23a, 23b are slidingly contacted with the magnetic tape 2, that is the readout timing, with the time point of writing the recording data on the recording tracks A1, B1, A2, B2, A3, B3 . . . by the first, and second recording heads 22a, 22b as the reference timing. Meanwhile, the readout timings $n_{11}$, $n_{12}$, $n_{21}$, $n_{22}$, . . . and $n_{11}'$, $n_{12}'$, $n_{21}'$, $n_{22}'$, . . . are denoted collectively by n and n', respectively, for convenience in explanation.

FIG. 5A describes the first playback as follows. When the data of the recording track recorded by the first, recording head 22a is to be read out by the first playback head 23a by way of monitoring the recorded data, the data is read out at the readout timings represented by a set of even numbers, if the timing of sliding contact of the first playback head 23a with the magnetic tape 2 is as shown in FIG. 5A. This indicates that, for a particular magnetic tape, the recorded data is read out at the readout timing indicated by a certain set of even numbers, and that, for another magnetic tape, the recorded data is read out at the readout timing indicated by another set of even numbers.

FIG. 5B describes the second playback as follows. When the data of the recording track recorded by the first recording head 22a is to be read out by the second playback head 23b by way of monitoring the recorded data, the data are read out at the readout timings represented by a set of odd numbers, if the timing of sliding contact of the first playback head 23a with the magnetic tape 2 is 0 as shown in FIG. 5B. That is, for a particular magnetic tape, the recorded data is read out at the readout timing indicated by a certain set of odd numbers, and that, for another magnetic tape, the recorded data is read out at the readout timing indicated by another set of odd numbers.

Given the readout timing n indicated by the sets of even or odd numbers, the track pitch tp of the recording format on the magnetic tape 2 and the head width hw of the playback heads 23a, 23b, the level difference H may be found from the following equation (1):

$$H = (n+0.5) \times tp + (hw-tp)/2 = n \times tp + hw/2 \quad (1)$$

In light of the forgoing, in finding a common level difference H for checking the recorded data recorded on plural magnetic tapes having different track pitches by the playback heads 23a, 23b, it may be seen that, since the head width of the playback heads 23a, 23b is constant, the readout timing n is changed. If the track pitch of a given magnetic tape is tp and its readout timing is n, and the track pitch of another given magnetic tape is tp' and its readout timing is n', it is seen from the equation (1) that the track pitches and the readout timings are related to one another as shown in the following equation (2):

$$n \times tp + hw/2 = n' \times tp' + hw/2$$

$$n \times tp = n' \times tp'$$

$$n:n' = tp':tp \quad (2)$$

As will be seen from the equation (2), the ratio n:n' is determined by the value of tp'. Since the ratio n:n' must by an even number to even number ratio or an odd number to odd number ratio, the selection of tp' is crucial in the disposition of the playback heads. The above also holds true for three different track pitches, such that the ratios n:n':n'' for different track pitches tp, tp' and tp'' may also be found.

For ease in understanding, the n–n' combination and the track pitch ratio, which do not lead to failure, are given in the following table 1:

TABLE 1

| | \multicolumn{11}{c}{n'} |
|---|---|---|---|---|---|---|---|---|---|---|---|
| | 0 | 1 | 2 | 3 | 4 | 5 | 6 | 7 | 8 | 9 | 10 |
| 0 | ⊙ | — | — | — | — | — | — | — | — | — | — |
| 1 | — | — | — | 3 | — | 5 | — | 7 | — | 9 | — |
| 2 | — | — | — | — | 2 | — | 3 | — | 4 | — | 5 |
| 3 | — | — | — | — | — | 1.67 | — | 2.33 | — | 3 | — |
| 4 | — | — | — | — | — | — | 1.5 | — | 2 | — | 2.5 |
| 5 | — | — | — | — | — | — | — | 1.4 | — | 1.8 | — |
| 6 | — | — | — | — | — | — | — | — | 1.33 | — | 1.67 |
| 7 | — | — | — | — | — | — | — | — | — | 1.29 | — |
| 8 | — | — | — | — | — | — | — | — | — | — | 1.25 |

N.B. No constraint on tp' if n = n' = 0. One of n and n' can not be set to zero.

For example, the readout timings associated with two different recording formats DDS and DDS-2, presently employed as the recording formats for R-DAT, and the level difference between the recording heads 22a, 22b on one hand and the playback heads 23a, 23b on the other hand, can be found.

The track pitch for the DDS format is 13.6 μm, which is defined as the track pitch tp for a particular magnetic tape. On the other hand, the track pitch for the DDS-2 format is 9.1 μm, which is defined as the track pitch tp' for another magnetic tape. Since the track pitch ratio tp/tp' in this case is equal to 1.5, n:n' is 4:6. With the head width hw of the playback heads equal to 16 μm, the level difference H is set to 62.4 ($\approx$62) μm from the equation (1).

That is, with the magnetic tape having the DDS format, the sliding contact positions of the first and second playback heads 23a, 23b at the readout timing of n=4 shown in FIG. 5A are coincident with the recording tracks on which data recording has been made by the first and second playback heads 22a and 22b, respectively. Consequently, the recording state of the recorded data may be checked by setting the data reproduced at the abovementioned readout timing as the monitoring data of the data recorded by the first and second recording heads 22a, 22b.

Specifically, if the time point when data has been recorded on the recording track A1 by the first recording head 22a is the time reference, the first reproducing head 23a is slidingly contacted with the recording track A1 at the readout timing $n_{11}=4$, so that the recording state of the data recorded on the recording track A1 may be checked by reading the playback data from the first playback head 23a.

Similarly, if the time point when data has been recorded on the recording track B1 by the second recording head 22b is the time reference, the second reproducing head 23b is slidingly contacted with the recording track B1 at the readout timing $n_{12}=4$, so that the recording state of the data recorded on the recording track B1 may be checked by reading the playback data from the second playback head 23b.

On the other hand, with the magnetic tape having the DDS format, the sliding contact positions of the first and second playback heads 23a, 23b at the readout timing of n'=6 shown in FIG. 5A are coincident with the recording tracks on which data recording has been made by the first and second playback heads 22a and 22b, respectively. Consequently, the recording state of the recorded data may be checked by setting the data reproduced at the above-mentioned readout timing as the monitoring data of the data recorded by the first and second recording heads 22a, 22b.

Specifically, if the time point when data has been recorded on the recording track A1 by the first recording head 22a is the time reference, the first reproducing head 23a is slidingly contacted with the recording track A1 at the readout timing $n_{11}'=6$, so that the recording state of the data recorded on the recording track A1 may be checked by reading the playback data from the first playback head 23a.

Similarly, if the time point when data has been recorded on the recording track B1 by the second recording head 22b is the time reference, the second reproducing head 23b is slidingly contacted with the recording track B1 at the readout timing $n_{12}'=6$, so that the recording state of the data recorded on the recording track B1 may be checked by reading the playback data from the second playback head 23b.

Meanwhile, as for disposition of the recording heads 22a, 22b and the playback heads 23a, 23b, these heads are normally not spaced apart at an angular distance of 90° because the angular distance has to be corrected for taking the level difference H into account. In this case, an optimum correcting value becomes different due to the difference in the readout timing n and the track pitch p. For the present, a mean value of the calculated value for the track pitch of 13.6 μm and the calculated value for the track pitch of 9.1 μm is employed as a design value which depends on the margin of the inlet and the outlet of the magnetic head.

Figure 6:
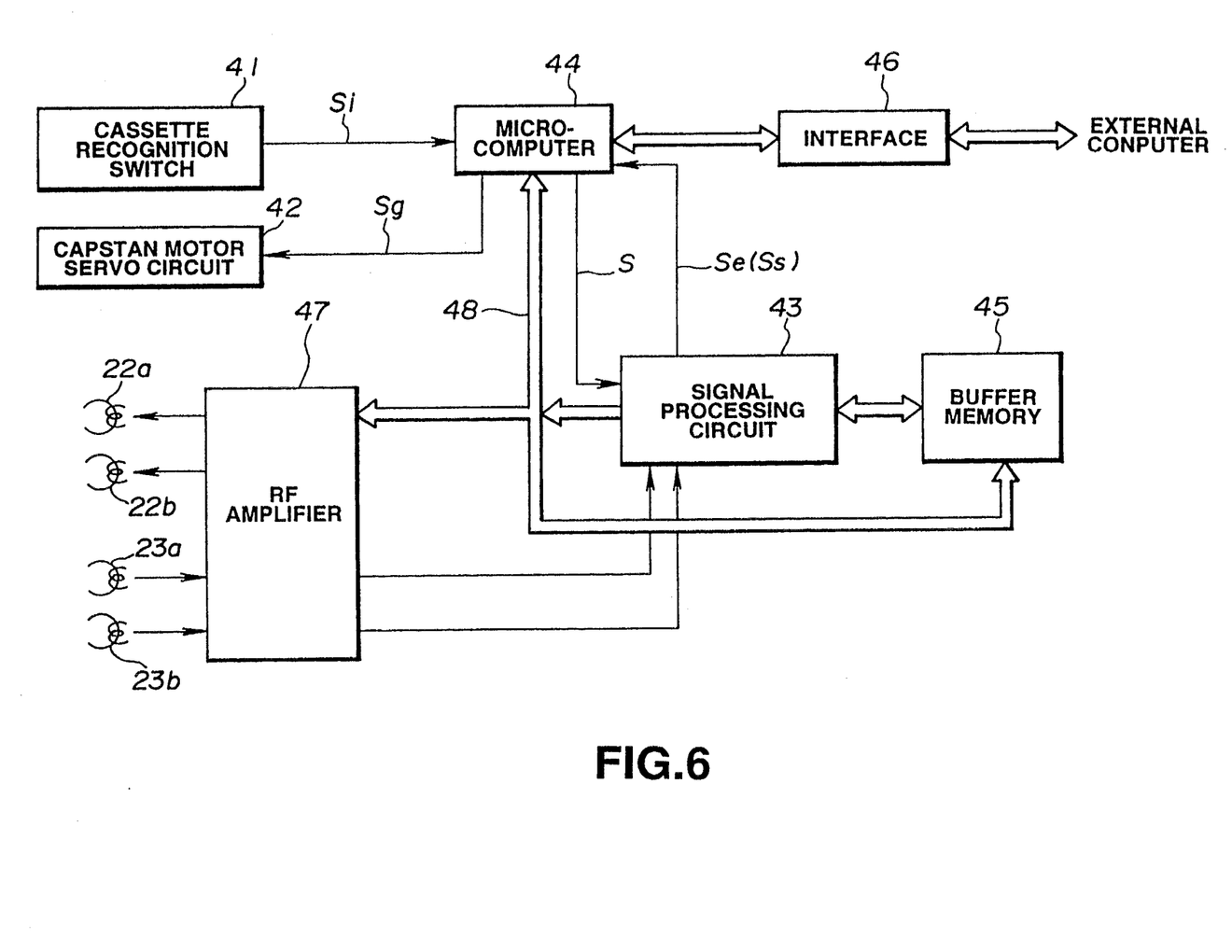
FIG. 6 is a block circuit diagram showing a signal processing system in the magnetic tape recording/playback device according to the present invention.

Referring to FIG. 6, a signal processing system of the magnetic tape recording/playback device according to the above-described embodiment is hereinafter explained.

The signal processing system includes a cassette recognition switch 41 for discriminating the type of the cassette loaded on the recording/playback device, a servo circuit 42 for a capstan motor for running the magnetic tape 2, a signal processing circuit 43 for reading out data from the playback heads 23a, 23b based on the above-mentioned readout timing and comparing the read-out data to the recording data for finding an error rate, and a buffer memory 45 for temporarily storing a series of recording data transmitted via a micro-computer 44, as shown.

The recording data in the present embodiment is the back-up data from an external computer and is supplied via an interface 46, such as SCSI, to the micro-computer 44, along with the write commands, so as to be processed with demodulation, such as PCM or appendage of error correction code, before being sequentially stored in the buffer memory 45. The recording data sequentially transmitted from the micro-computer 44 is simultaneously supplied to an RF amplifier 47 and thereby converted into bi-level data which are supplied to the first and second recording head 22a and 22b.

As the rotary head 1 is revolved in one direction and the magnetic tape 2 is run, the data supplied to the first and second recording head 22a and 22b is recorded under the helical scan system as the information of magnetization on the magnetic tape 2 for forming recording tracks (A1, B1), (A2, B2), (A3, B3) . . .

The signal processing circuit 43 includes, in the inside thereof, a ROM having pre-set data stored therein, a counter for counting the readout timing for the playback heads 23a, 23b, an error rate decision unit for comparing the recording data to the playback data, and a control unit for controlling counter updating and data access to and from ROM and buffer memory and for transmission of control signals to the micro-computer. The data stored in the ROM includes format-associated timing values and dummy data, such as one-frame dummy data, employed for re-recording. As for re-recording, an explanation will be given subsequently.

The operation of the signal processing system of the above-described magnetic tape recording/playback device is explained. When the tape cassette 4 (FIG. 1) is loaded on the magnetic tape recording/playback device, a tape cassette type recognition hole formed in the tape cassette 4 is detected by the cassette recognition switch 41. An electrical signal Si is issued by the switch 41 responsive to such detection and transmitted to the micro-computer 44. The micro-computer 44 is responsive to the detection signal Si from the switch 41 to determine whether the loaded tape cassette 4 is of the DDS format or of the DDS-2 format to issue a corresponding decision signal S which is supplied to the signal processing circuit 43.

If the loaded tape cassette 4 is of the DDS format, for example, the counter within the signal processing circuit 4 is set from ROM to a timing value associated with the DDS format, herein n=4, as an initial value or an as-reset value.

The micro-computer 44 then transmits, based on a write command supplied from the external computer, a rotational timing signal Sg and a gain signal associated with the DDS format to the servo control circuit 42 for the capstan motor.

The magnetic tape 2 is run at a speed conforming to the gain signal and the rotational timing signal Sg. The micro-computer 44 performs modulation, such as PCM and error correction code appendage, on the computer data supplied thereto in the wake of the write command before supplying the computer data via the data bus 48 to the RF amplifier 47 and the buffer memory 45.

The RF amplifier 47 sequentially transforms the computer data supplied thereto from the micro-computer 44 into bi-level data to transmit the resulting bi-level data to the first and second recording heads 22a, 22b.

The first and second reproducing heads 23a, 23b sequentially read out the information of magnetization recorded on the magnetic tape 2 in the order in which the reproducing heads have had sliding contact with the magnetic tape 2 to transmit the read-out data to the signal processing circuit 43. The control section in the signal processing unit 43 updates, herein decrements, the count value of the counter each time the information of magnetization is supplied thereto from the first and second reproducing heads 23a, 23b. During the counter updating, the data from the reproducing heads 23a, 23b are disregarded. The data from the reproducing heads 23a, 23b which occurs at a timing next to the timing when the counter value reaches zero by such updating is read into the signal processing circuit 43.

The data thus read, which is the data which has been written on the recording track A1, is compared in an error rate decision section in the signal processing unit 43 to the recorded data on the recording track A1 temporarily stored in the buffer memory 45. If the results of comparison indicates that the two data are the same data, the recording state is decided to be satisfactory, and the recorded data stored in the buffer memory 45 is discarded.

The recorded data on the next recording track B2 is read by the second reproducing head 23b, with the counter value remaining to be zero, and is supplied to the signal processing circuit 43. The reproduced data thus supplied to the signal processing circuit 43 is compared by the error rate decision circuit in the processing circuit 43 to the recorded data on the recording track B2 stored in the buffer memory 45.

If the results of the comparison indicate that the two data are the same data, the recorded data on the recording track B2 in the buffer memory B2 is discarded, in the same manner as described above. From this time on, the recording tracks on which data have been recorded by the recording heads 22a, 22b and the readout timing by the reproducing heads 23a, 23b are related to each other by n=4. Data on the corresponding recording tracks are sequentially read by the first and second reproducing heads 23a, 23b without updating the counter, and the playback data thus read is compared by the error rate decision unit in the signal processing circuit 43 to the recorded data on the corresponding recording tracks stored in the buffer memory 45. If the results of that comparison indicate that the two data are the same data, the recorded is are sequentially discarded from the buffer memory 45.

Figure 7A:
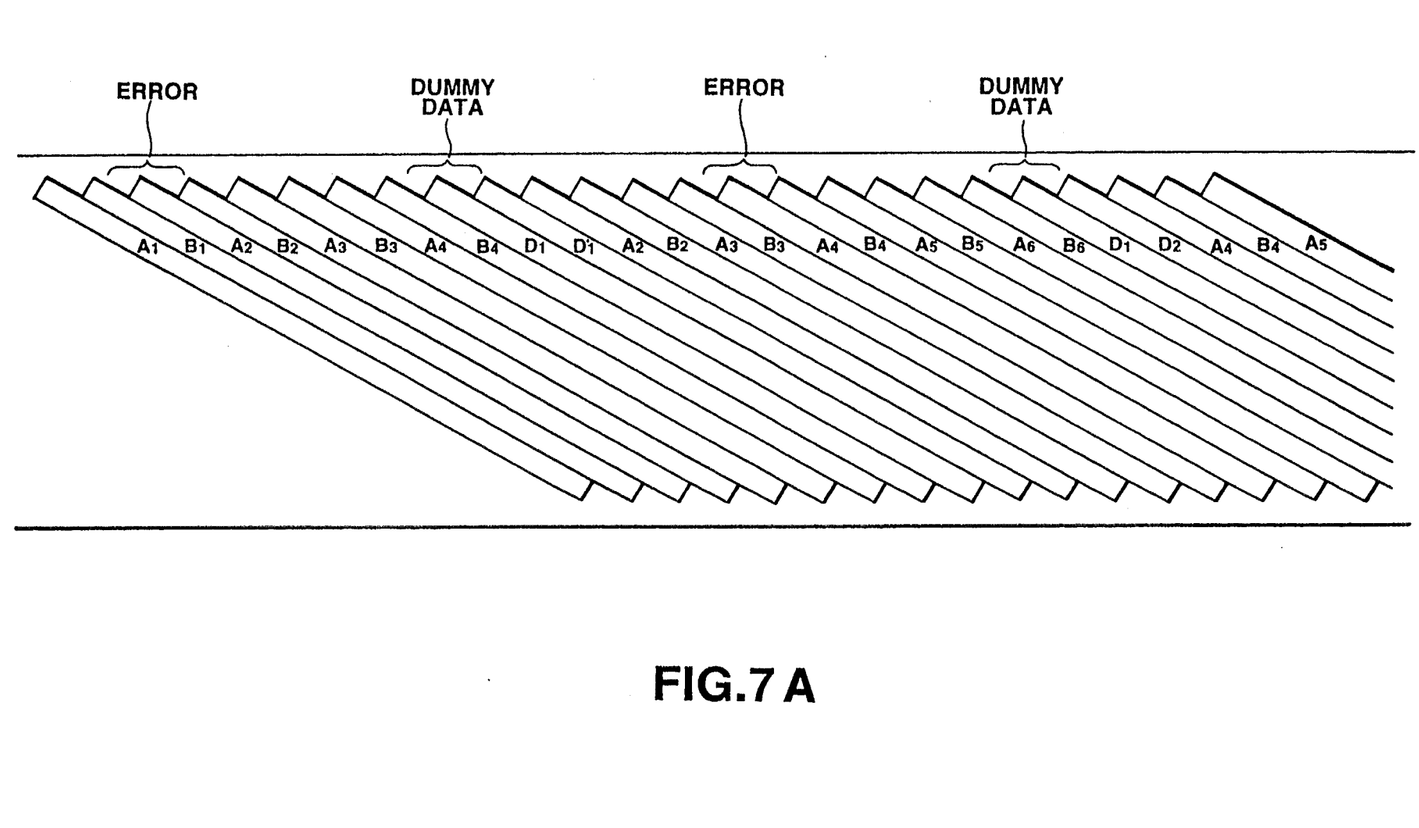
FIGS. 7A and B illustrate, by track patterns, the rerecording by the magnetic tape recording/playback device according to the present invention.
Figure 7B:
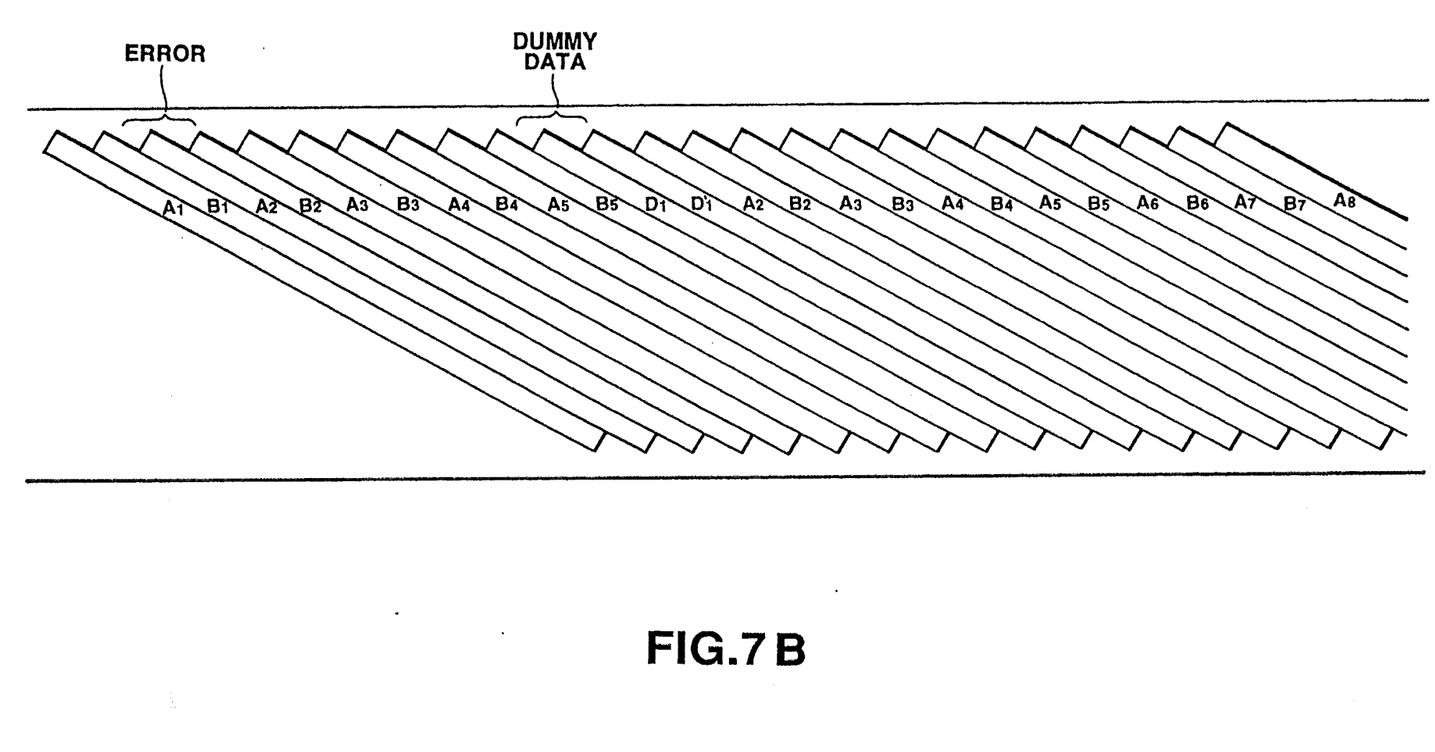

If the results of comparison fail to indicate that the two data are the same data, the following re-recording is performed. If the results of comparison indicate that the two data are different data for the recording tracks A2 or B2 of the second frame, that is there exists an error, as shown in FIGS. 7A and 7B, dummy data D1, D1' corresponding to one frame are recorded on the magnetic tape 2. That is, the data for the fourth frame, that is the recording tracks A4, B4, are already recorded by the first and second recording heads 22a, 22b when the second frame is being monitored by the first and second playback heads 23a, 23b, as shown in FIG. 7A.

Consequently, the one-frame dummy data D1, D1' are recorded in the next frame, that is in the fifth frame. That is, the dummy data D1, D1' are recorded in the third frame as counted from the frame which has caused the error. Subsequently, the data from the second frame on, that is the data A2, B2, A3, B3, A4 and B4, are again recorded as from the sixth frame on.

As for the signal processing for such re-recording, if it has been found at the error rate decision unit, that the results of comparison indicate different data, that is the occurrence of an error, the control section issues a data transmission inhibition signal Se to the micro-computer 44. The inhibition signal is issued at a stage of completion of recording in the recording track B2 even if the error has occurred at the recording track A2 of the second frame, because it is more convenient to perform recording data management on the frame basis.

The control section then reads out the one-frame dummy data D1, D1' from the ROM to transmit the dummy data to the first and second recording heads 22a, 22b via the data bus 48 and the RF amplifier 47. In this manner, the dummy data D1, D1' are recorded in the fifth frame on the magnetic tape 2. The control section then reads the data A2, B2 of the second frame in which the error has been produced and the next following data A3, B3 and A4, B4 of the third and fourth frames from the buffer memory 45 to supply the read-out data to the first and second recording heads via the data bus 48 and the RF amplifier 47.

The control section then issues a re-transmission request signal Ss. Based on the reception of the re-transmission request signal Ss, the micro-computer 44 transmits data from the next frame, that is from the data A5, B5 of the fifth frame on, to the first and second recording heads via the data bus 48 and the RF amplifier 47.

When reproducing the data recorded on the magnetic tape 2, the recorded data is sequentially read out from the first frame A1, B1 on. However, three-frame data are stored transiently in the buffer memory 45 in a cyclic manner and, if the next frame is not the dummy data D1, D1', the data of the leading frame are transmitted to the external computer via the micro-computer 44. The data thus read out are stored on the tape after the remaining data.

If the dummy data D1, D1' have been read out, the data stored in the buffer memory 45 are handled as being invalid data and the data recorded on the three frames following the frame of the dummy data D1, D1' are stored by overwriting in the buffer memory 45 in a cyclic manner. In such case, the dummy data D1, D1' are not stored. The data are transmitted sequentially to the external computer by the above-described sequence of operations.

If the dummy data D1, D1' have been detected several times, or if, with a number of, for example 23, frames as one group, the last frame in the group is the dummy data D1, D1', the magnetic tape 2 is rewound to its starting position for re-reading.

Meanwhile, for positive readout of the dummy data D, dummy data of up to three frames at the maximum, that is dummy data D1, D1', D2, D2', D3 and D3', may be recorded on the magnetic tape.

In such case, recording of the dummy data D1, D1', D2, D2', D3 and D3' of the three frames at the maximum is made on the third frame ff. as from the frame in which the error has been initiated.

The data of the frames next to the frame in which the error has been initiated is recorded after recording has been made of the dummy data of the three frames at the maximum.

If the loaded tape cassette 4 is of the DDS-2 format, for example, the counter in the signal processing circuit 43 has its initial value or as-reset value registered by the ROM to a timing value associated with the DDS-2 format, herein to $n=6$, and the dummy data D1, D1' are recorded for re-recording in the fourth frame as counted from the frame in which the error has been initiated, as shown in FIG. 7B. Besides, when reproducing the data recorded on the recording tape 2, four-frame data are transiently stored in the buffer memory 45 in a cyclical manner, while it is possible to make recording of the dummy data of the three frames D1, D1', D2, D2', D3 and D3' at the maximum in the fourth frame ff. as counted from the frame in which the error has been initiated. However, the operation for the DDS-2 format is otherwise the same as that for the DDS format described above. Consequently, the detailed description of the operation for the DDS-2 format is not made herein for simplicity.

It is seen from the above that, with the magnetic tape recording/playback device according to the present invention, the recorded data may be monitored not only for the magnetic tape having the DDS format, but also for the magnetic tape having the DDS-2 format with a different track pitch.

Besides, since it suffices to employ two playback heads 23a, 23b as reproducing heads, and to provide the two playback heads 23a, 23b at an angular interval of substantially 180° from each other at a height lower than the recording heads 22a, 22b by a level difference H represented by the equation 1, there is no necessity for undertaking any drastic design changes for accommodating plural track pitches, such as changing the construction of the rotary drum 21 or increasing the number of magnetic heads or channels of the rotary transformers.

Consequently, the width of the reproducing heads 23a or 23b is not dependent on the optimum head width derived from the electro-magnetic conversion characteristics or ATF characteristics to render it possible to avoid complicated designing for accommodating plural track pitches or complicated production process with consequent rise in production costs. In addition, since it becomes possible as cause the playback heads to trace the recording tracks of the plural recording tapes having different track pitches, the accurate monitoring information may be obtained even if the margin of width of the playback heads 23a, 23b is selected to a smaller value.

What is claimed is:
1. A recording/playback device for a magnetic tape, comprising:
a rotary drum having an axis of rotation and about which a magnetic tape is wrapped obliquely for a certain angular extent;
first and second recording heads arranged within said rotary drum at an angular distance of substantially 180° from each other for recording data in slanted tracks on said magnetic tape;
first and second playback heads arranged within said rotary drum at an angular distance of substantially 180° from each other for reproducing the data recorded on said magnetic tape;
said first and second recording heads and said first and second playback heads being arranged within said rotary drum so that a straight line interconnecting said first and second recording heads and another straight line interconnecting said first and second playback heads are normal to each other;
said first and second recording heads being mounted on said rotary drum as to be spaced above said first and second playback heads relative to said axis of rotation by a predetermined level difference H related to a track pitch of a recording format for a particular magnetic tape;
a signal processing circuit for recognizing readout timing of playback data sequentially reproduced by said first and second playback heads for monitoring the data recorded by the recording heads;
wherein said level difference H is given by

$$H = n \times tp + hw/2$$

where hw is the width of each of said first and second playback heads and a ratio of a track pitch tp of said particular magnetic tape to a track pitch tp' of another magnetic tape is an even number to even number ratio or an odd number to odd number ratio, and an even number or an odd number for said particular magnetic tape being a readout timing n, and wherein said processing circuit recognizes the readout timing of the playback data supplied from each of said first and second playback heads determined by said even number to even number ratio or said odd number to odd number ratio as the monitoring data for the magnetic tape;
and wherein when said ratio is the even number to even number ratio, said signal processing circuit recognizes the playback data read out by said first and second playback heads as monitoring data for data recorded by said first and second recording heads, respectively, and wherein, when said ratio is the odd number to odd number ratio, said signal processing circuit recognizes the playback data read out by said first and second playback heads as monitoring data for data recorded by said second and first recording heads, respectively.

2. The recording/playback device for a magnetic tape as claimed in claim 1, further comprising:
detection means for detecting the recording format of the data recorded on the magnetic tape, the control of the readout timing value by said signal processing circuit being made on the basis of detection by said detection means.

3. A recording/playback device for a magnetic tape, comprising:
- a rotary drum having an axis of rotation and about which a magnetic tape is wrapped obliquely for a certain angular extent;
- first and second recording heads arranged within said rotary drum at an angular distance of substantially 180° from each other for recording data in slanted tracks on said magnetic tape;
- first and second playback heads arranged within said rotary drum at an angular distance of substantially 180° from each other for reproducing the data recorded on said magnetic tape;
- said first and second recording heads and said first and second playback heads being arranged within said rotary drum so that a straight line interconnecting said first and second recording heads and another straight line interconnecting said first and second playback heads are normal to each other;
- said first and second recording heads being mounted on said rotary drum as to be spaced above said first and second playback heads relative to said axis of rotation by a predetermined level difference H related to a track pitch of a recording format for a particular magnetic tape;
- a signal processing circuit for recognizing readout timing of playback data sequentially reproduced by said first and second playback heads for monitoring the data recorded by the recording heads;
- wherein said level difference H is given by $$H = n \times tp + hw/2$$

where hw is the width of each of said first and second playback heads and a ratio of a track pitch tp of said particular magnetic tape to a track pitch tp' of another magnetic tape is an even number to even number ratio or an odd number to odd number ratio, and an even number or an odd number for said particular magnetic tape being a readout timing n, and wherein said processing circuit recognizes the readout timing of the playback data supplied from each of said first and second playback heads determined by said even number to even number ratio or said odd number to odd number ratio as the monitoring data for the magnetic tape; and
- memory means for storing data recorded by each of the recording heads,
- the data recorded by each of said recording heads being compared to the monitoring data read from each of said playback heads in association with the recorded data for finding an error rate.

4. A recording/playback device for a magnetic tape, comprising:
- loading means for pulling out a magnetic tape from a tape cassette about which said magnetic tape is wound;
- a cylindrical-shaped rotary drum having a rotary axis and about which the magnetic tape is obliquely wrapped over an angular extent of substantially 90° by said loading means;
- first and second recording heads arranged within said rotary drum at an angular distance of substantially 180° from each other for recording data on said magnetic tape by straight slanted tracks according to a helical-scan system;
- first and second playback heads arranged within said rotary drum at an angular distance of substantially 180° from each other for reading and reproducing data recorded on said magnetic tape;
- said first and second recording heads and said first and second playback heads being arranged within said rotary drum so that a straight line interconnecting said first and second recording heads and another straight line interconnecting said first and second playback heads are normal to each other;
- there being a level difference H determined on the basis of respective track pitches of different recording formats of plural different magnetic tapes between said first and second recording heads and said first and second playback heads, said first and second playback heads being mounted on said rotary drum at a lower position relative to said first and second recording heads forming said level difference H in relation to said rotary axis of said drum;
- wherein said level difference H is given by $$H = n \times tp + hw/2$$

where hw is the width of each of the playback heads and a ratio of a track pitch tp of a particular one of said plural different magnetic tapes to a track pitch tp' of another of said different magnetic tapes is an even number to even number ratio or an odd number to odd number ratio, and an even number or an odd number for said particular magnetic tape being a readout timing n;
- a signal processing circuit for recording data by said first and second recording heads on the magnetic tape and sequentially reading the recorded data by said first and second playback heads, said signal processing circuit recognizing the playback data read out at a readout timing as determined on the basis of a track pitch of the recorded data for monitoring the data recorded by said first or second recording heads, said signal processing circuit comparing the data recorded by said first and second recording heads to the monitoring data associated with the recorded data as read by said first and second playback heads for finding an error rate;
- and wherein said processing circuit recognizes the readout timing of the playback data supplied from each of the playback heads which is determined by said even number to even number ratio or the odd number to odd number ratio as the monitoring data for the magnetic tape;
- said processing circuit recognizing the readout timing playback data read out by the first and second reproducing heads as the monitoring data of the data recorded by said first and second recording heads, respectively, when said ratio is the even number to even number ratio, said processing circuit also recognizing the playback data read out by the first and second reproducing heads as the monitoring data of the data recorded by said second and first recording heads, respectively, when said ratio is the odd number to odd number ratio.

5. The recording/playback device for a magnetic tape as claimed in claim 4, further comprising:
- detection means for detecting the format recorded on the magnetic tape, the control of the readout timing value by said signal processing circuit being made on the basis of detection by said detection means.

* * * * *